(12) United States Patent
Temple et al.

(10) Patent No.: US 7,786,049 B2
(45) Date of Patent: *Aug. 31, 2010

(54) DRILLING FLUIDS WITH IMPROVED SHALE INHIBITION AND METHODS OF DRILLING IN SUBTERRANEAN FORMATIONS

(75) Inventors: Colin Temple, Aberdeenshire (GB); Arthur Youngson, Aberdeen (GB)

(73) Assignee: Halliburton Energy Services, Inc., Duncan, OK (US)

( * ) Notice: Subject to any disclaimer, the term of this patent is extended or adjusted under 35 U.S.C. 154(b) by 1148 days.

This patent is subject to a terminal disclaimer.

(21) Appl. No.: 10/776,887

(22) Filed: Feb. 11, 2004

(65) Prior Publication Data

US 2004/0204323 A1 Oct. 14, 2004

Related U.S. Application Data

(63) Continuation-in-part of application No. 10/411,015, filed on Apr. 10, 2003, now Pat. No. 7,087,554.

(51) Int. Cl.
C09K 8/12 (2006.01)
C09K 8/52 (2006.01)

(52) U.S. Cl. .................. 507/123; 507/130; 507/137; 507/140; 507/221; 507/229; 507/242; 507/263; 507/269; 166/305.1

(58) Field of Classification Search ............. 507/125, 507/123, 903
See application file for complete search history.

(56) References Cited

U.S. PATENT DOCUMENTS

| | | | |
|---|---|---|---|
| 2,146,693 A | 2/1939 | Vietti et al. | |
| 2,165,823 A | 7/1939 | Vietti et al. | |
| 2,205,609 A | 6/1940 | Vali et al. | |
| 2,294,078 A | 8/1942 | Dow et al. | |
| 2,990,016 A | 6/1961 | William, Jr. et al. | |
| 3,025,234 A | 3/1962 | Canterino | 506/119 |
| 3,235,490 A | 2/1966 | Goren | 210/52 |
| 3,252,904 A | 5/1966 | Carpenter | 252/8.55 |
| 3,350,366 A * | 10/1967 | Merijan | 525/283 |
| 3,359,225 A | 12/1967 | Weisend | 260/29.6 |
| 3,380,529 A * | 4/1968 | Hendrickson | 166/295 |
| 3,397,744 A * | 8/1968 | Hort et al. | 166/308.5 |
| 3,504,746 A * | 4/1970 | Freifeld et al. | 166/295 |
| 3,554,287 A | 1/1971 | Eilers et al. | |
| 3,617,095 A * | 11/1971 | Lissant | 406/197 |
| 3,640,343 A | 2/1972 | Darley | |
| 3,679,001 A | 7/1972 | Hill | |
| 3,738,437 A | 6/1973 | Scheuerman | 175/70 |
| 3,746,109 A | 7/1973 | Darley | |
| 3,843,524 A | 10/1974 | Perricone et al. | 252/1 |
| 3,915,232 A | 10/1975 | Gruesbeck et al. | |
| 3,915,323 A | 10/1975 | Underhill | 414/462 |
| 3,924,684 A * | 12/1975 | Tate | 166/307 |
| 3,927,717 A * | 12/1975 | Tate | 166/271 |
| 4,018,286 A | 4/1977 | Gall et al. | |
| 4,033,893 A | 7/1977 | Mondshine | 252/805 A |
| 4,045,357 A | 8/1977 | Reed | 506/123 |
| 4,079,011 A * | 3/1978 | Tate | 507/225 |
| 4,098,337 A | 7/1978 | Argabright et al. | |
| 4,141,416 A | 2/1979 | Holm | |
| 4,142,595 A | 3/1979 | Anderson et al. | 175/72 |
| 4,186,803 A * | 2/1980 | Mondshine | 166/292 |
| 4,235,728 A | 11/1980 | Schulz et al. | |
| 4,302,341 A | 11/1981 | Watson | |
| 4,343,363 A | 8/1982 | Norton et al. | |
| 4,391,643 A | 7/1983 | Murphey | |
| 4,440,649 A | 4/1984 | Loftin et al. | 252/8.5 C |
| 4,460,627 A | 7/1984 | Weaver et al. | 427/212 |
| 4,466,831 A | 8/1984 | Murphhey | |
| 4,486,316 A | 12/1984 | Carriere et al. | |
| 4,490,261 A | 12/1984 | Heilweil | 507/123 |

(Continued)

FOREIGN PATENT DOCUMENTS

EP 0 188 856 7/1986

(Continued)

OTHER PUBLICATIONS

Foreign communication from a related counterpart application dated Jun. 1, 2005.

(Continued)

*Primary Examiner*—James Seidleck
*Assistant Examiner*—John J Figueroa
(74) *Attorney, Agent, or Firm*—Craig W. Roddy; Baker Botts, LLP

(57) ABSTRACT

The present invention relates to subterranean drilling operations, and more particularly, to drilling fluids that may be used to drill a well bore in a subterranean formation that may demonstrate improved shale inhibition and methods of using such drilling fluids in subterranean formations. One embodiment of the methods of the present invention provides a method of drilling a well bore in a subterranean formation comprising providing a drilling fluid comprising an aqueous-based fluid and a shale inhibiting component comprising a nanoparticle source; and placing the drilling fluid in the well bore in the subterranean formation. Another embodiment of the present invention provides a method of flocculation comprising providing a fluid comprising suspended particles, and adding a shale inhibiting component comprising a nanoparticle source to the fluid comprising suspended particles to form flocculated particles.

32 Claims, No Drawings

U.S. PATENT DOCUMENTS

| | | | |
|---|---|---|---|
| 4,498,994 A * | 2/1985 | Heilweil | 507/120 |
| 4,514,310 A | 4/1985 | Heilweil | 507/229 |
| 4,521,136 A | 6/1985 | Murphey | |
| 4,525,285 A | 6/1985 | Son et al. | |
| 4,532,052 A | 7/1985 | Weaver et al. | 252/8.55 R |
| 4,536,297 A | 8/1985 | Loftin et al. | 252/8.5 C |
| 4,625,802 A | 12/1986 | Sydansk | |
| 4,644,020 A | 2/1987 | Stahl | 522/79 |
| 4,664,816 A | 5/1987 | Walker | |
| 4,741,843 A | 5/1988 | Garvey et al. | 252/8.514 |
| 4,757,862 A | 7/1988 | Maiman et al. | 166/295 |
| 4,792,412 A * | 12/1988 | Heilweil | 507/123 |
| 4,941,981 A | 7/1990 | Perricone et al. | 252/8.51 |
| 4,988,450 A | 1/1991 | Wingrave et al. | 252/8.514 |
| 5,035,812 A | 7/1991 | Aignesberger et al. | 507/119 |
| 5,196,143 A | 3/1993 | Burba et al. | |
| 5,198,415 A | 3/1993 | Steiger | 507/103 |
| 5,208,216 A | 5/1993 | Williamson et al. | 507/120 |
| 5,211,250 A | 5/1993 | Kubena, Jr. et al. | |
| 5,616,541 A * | 4/1997 | Dobson et al. | 507/145 |
| 5,620,947 A | 4/1997 | Elward-Berry | |
| 5,635,458 A | 6/1997 | Lee et al. | 507/240 |
| 5,654,261 A | 8/1997 | Smith | 507/269 |
| 5,783,527 A * | 7/1998 | Dobson et al. | 507/269 |
| 5,874,111 A * | 2/1999 | Maitra et al. | 424/499 |
| 5,945,387 A * | 8/1999 | Chatterji et al. | 507/224 |
| 6,054,416 A | 4/2000 | Bland | 507/136 |
| 6,059,035 A | 5/2000 | Chatterji et al. | |
| 6,131,661 A * | 10/2000 | Conner et al. | 166/300 |
| 6,180,689 B1 * | 1/2001 | Moulin | 523/130 |
| 6,204,224 B1 | 3/2001 | Quintero et al. | 507/123 |
| 6,248,698 B1 | 6/2001 | Mullen et al. | 507/140 |
| 6,291,405 B1 | 9/2001 | Lee et al. | 507/136 |
| 6,422,325 B1 | 7/2002 | Krieger | 175/50 |
| 6,431,280 B2 | 8/2002 | Bayliss et al. | |
| 6,435,276 B1 | 8/2002 | Kercheville et al. | 166/255.1 |
| 6,497,283 B1 | 12/2002 | Eoff et al. | 166/293 |
| 6,579,832 B2 * | 6/2003 | Jimenez et al. | 507/143 |
| 6,586,371 B1 * | 7/2003 | Maroy et al. | 507/120 |
| 6,615,918 B2 | 9/2003 | Bayliss et al. | |
| 6,642,183 B1 | 11/2003 | Bass et al. | |
| 6,656,266 B1 * | 12/2003 | Barlet-Gouedard et al. | 106/802 |
| 6,716,799 B1 | 4/2004 | Mueller et al. | |
| 6,838,082 B2 | 1/2005 | Growcock et al. | |
| 6,955,220 B2 * | 10/2005 | Maberry et al. | 166/292 |
| 7,033,975 B2 * | 4/2006 | Baran et al. | 507/102 |
| 7,087,554 B2 | 8/2006 | Youngson et al. | |
| 7,276,249 B2 * | 10/2007 | Ryde et al. | 424/451 |
| 7,320,802 B2 * | 1/2008 | Ryde et al. | 424/451 |
| 7,348,365 B2 * | 3/2008 | Lee et al. | 516/78 |
| 7,605,112 B2 | 10/2009 | Orton et al. | |
| 2002/0012675 A1 * | 1/2002 | Jain et al. | 424/400 |
| 2002/0149656 A1 * | 10/2002 | Nohr et al. | 347/95 |
| 2002/0160919 A1 * | 10/2002 | Stowe et al. | 507/100 |
| 2003/0234103 A1 | 12/2003 | Lee et al. | |
| 2004/0050589 A1 | 3/2004 | Head | |
| 2004/0106525 A1 * | 6/2004 | Willberg et al. | 507/200 |
| 2004/0204323 A1 | 10/2004 | Temple et al. | |
| 2004/0235674 A1 | 11/2004 | Youngson et al. | |
| 2005/0006305 A1 * | 1/2005 | Juby et al. | 210/603 |
| 2007/0015668 A1 | 1/2007 | Harrower et al. | |

FOREIGN PATENT DOCUMENTS

| | | |
|---|---|---|
| EP | 0 668 339 A1 | 2/1995 |
| EP | 0 668 339 A1 | 8/1995 |
| GB | 1082046 | 9/1967 |
| GB | 2267921 A | 6/1992 |
| GB | 2 267 921 A | 12/1993 |
| WO | WO 96/03474 A2 | 2/1996 |
| WO | WO 96/04348 | 2/1996 |
| WO | WO 96/04348 A1 * | 2/1996 |
| WO | WO 97/05212 | 2/1997 |
| WO | WO 02/087749 A1 * | 11/2002 |
| WO | WO 2004/090067 A2 | 10/2004 |
| WO | WO2004090067 | 10/2004 |
| WO | WO 2006/111703 | 10/2006 |
| WO | WO 2007/010212 | 1/2007 |

OTHER PUBLICATIONS

Foreign communication from a related counterpart application dated Dec. 20, 1988.
Foreign communication from a related counterpart application dated Sep. 9, 2004.
SPE 14248 entitled "Shale Stabilization Principles" by L.E. Nesbitt et al. dated 1985.
Baroid brochure entitled "BARACAT® Shale Stabilizer" dated 2002.
Baroid brochure entitled "BARASIL™-S Shale Stabilizer" dated 2002.
Baroid brochure entitled "BARO-TROL® Plus Shale Stabilizer" dated 1999.
Baroid brochure entitled "CLAYSEAL® Shale Stabilizer" dated 2002.
Baroid brochure entitled "EZ-MUD® Shale Stabilizer" dated 2002.
Baroid brochure entitled "GEM™ 2000 Shale Stabilizer" dated 2002.
Baroid brochure entitled HYDRO-GUARD™ Inhibitive Water-Based Fluid Dated 2002.
Paper entitled "Structural Insights into a Novel Molecular-Scale Composite of Soluble Poly(vinyl Pyrrolidone) Supporting Uniformly Dispered Nanoscale Poly(vinyl pyrrolidone) Particles" by David Hood, et al., dated 2002.
International Specialty Products brochure entitled "New ViviPrint™ Technology Commercially Available" dated 2002.
Zyvek brochure entitled "Nanotechnology" by Christine Peterson, undated, but admitted to be prior art.
Kodak brochure entitled "Nanoparticles and You—Chances are You've Got Them" dated 2001.
Paper entitled "Connections to Other Fields; Education Issues", by Gary Poehlein, dated 1998.
Office Action dated Nov. 1, 2005 for U.S. Appl. No. 10/411,015.
Office Action dated Apr. 20, 2005 for U.S. Appl. No. 10/411,015.
Office Action from U.S. Appl. No. 11/109,354, Mar. 8, 2007.
Office Action from U.S. Appl. No. 11/109,354, Aug. 29, 2006.
Office Action from U.S. Appl. No. 11/109,150, Mar. 29, 2007.
U.S. Appl. No. 11/183,113, filed Jul. 15, 2005, Harrower et al.
U.S. Appl. No. 11/109,150, filed Apr. 19, 2005, Oyler et al.
U.S. Appl. No. 11/109,354, filed Apr. 19, 2005, Oyler et al.
U.S. Appl. No. 11/183,122, filed Jul. 15, 2005, Harrower et al.
Foreign Communication from a Related Counterpart Application—PCT/GB2005/000411, Aug. 14, 2006.
Foreign Communication from a Related Counterpart Application—PCT/GB2006/002622, Sep. 25, 2006.
Foreign Communication from a Related Counterpart Application—PCT/GB2006/002622, Jan. 16, 2008.
Foreign Communication from a Related Counterpart Application—EP 05 702 136.2, May 29, 2007.
Foreign Communication from a Related Counterpart Application—PCT/GB2006/001286, Oct. 23, 2007.
Foreign Communication from a Related Counterpart Application—PCT/GB2006/001286, Jun. 16, 2007.
Foreign Communication from a Related Counterpart Application—PCT/GB2006/001244, Oct. 23, 2007.
Foreign Communication from a Related Counterpart Application—PCT/GB2006/001244, Dec. 28, 2006.
Notice of Allowance from U.S. Appl. No. 11/411,015, Apr. 21, 2006.
Office Action from U.S. Appl. No. 11/183,113, Feb. 6, 2008.
Office Action from U.S. Appl. No. 11/183,122, Feb. 6, 2008.
Office Action from U.S. Appl. No. 11/109,150, Sep. 21, 2007.
Office Action from U.S. Appl. No. 11/109,354, Dec. 12, 2007.
Office Action dated Jun. 9, 2008 from U.S. Appl. No. 11/109,150.
Office Action for U.S. Appl. No. 11/109,150, dated Feb. 19, 2009.

Office Action for U.S. Appl. No. 11/109,354, dated Mar. 24, 2009.
Office Action mailed Aug. 23, 2007 from U.S. Appl. No. 10/776,887.
Office Action mailed Jul. 29, 2008 from U.S. Appl. No. 11/109,354.
Office Action mailed Oct. 9, 2008, for U.S. Appl. No. 11/183,113.
Office Action mailed Oct. 9, 2008, for U.S. Appl. No. 11/183,113.
Office Action for U.S. Appl. No. 11/183,122, dated Jun. 15, 2009.
Office Action for U.S. Appl. No. 11/183,113, dated Oct. 1, 2009.
Definition of "Clay", Hawley's Condensed Chemical Dictionary, 14th Edition, KNOVEL, publisher, Richard J. Lewis Sr., editor, 2002; pages: Title and "Clay."
Final Office Action for U.S. Appl. No. 11/109,150 dated Nov. 17, 2009.
Office Action for U.S. Appl. No. 11/183,122 dated Mar. 16, 2010.
VIVIPRINT: Products for Digital Printing and Imaging; International Specialty Products; pp. 1-11; 2006.
Office Action from U.S. Appl. No. 11/109,150 dated Apr. 16, 2010.
Office Action from U.S. Appl. No. 11/109,354 dated Apr. 23, 2010.

* cited by examiner

DRILLING FLUIDS WITH IMPROVED SHALE INHIBITION AND METHODS OF DRILLING IN SUBTERRANEAN FORMATIONS

CROSS-REFERENCE TO RELATED APPLICATION

This application is a continuation-in-part of U.S. application Ser. No. 10/411,015 entitled "Drilling Fluids with Improved Shale Inhibition and Methods of Drilling in Subterranean Formations," filed on Apr. 10, 2003 now U.S. Pat. No. 7,087,554, which is incorporated herein by reference.

BACKGROUND OF THE INVENTION

The present invention relates to subterranean drilling operations, and more particularly, to drilling fluids that may be used to drill a well bore in a subterranean formation that may demonstrate improved shale inhibition and methods of using such drilling fluids in subterranean formations.

A drilling fluid used in connection with drilling a well in a subterranean formation is any number of fluids (gaseous or liquid) and mixtures of fluids and solids (such as solid suspensions, mixtures and emulsions of liquids, gases and solids) used in operations to drill well bores into subterranean formations. Drilling fluids are used, inter alia, to cool the drill bit, lubricate the rotating drill pipe to prevent it from sticking to the walls of the well bore, prevent blowouts by serving as a hydrostatic head to counteract the sudden entrance into the well bore of high pressure formation fluids, and remove drill cuttings from the well bore.

During drilling of subterranean well bores, it is not uncommon to encounter strata comprising reactive shales. As referred to herein, the term "shale" will be understood to mean materials such as certain types of clays (for example, bentonite) and related subterranean materials that may "swell," or increase in volume, when exposed to water. Reactive shales may be problematic during drilling operations because, inter alia, of their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface. Degradation of drilled cuttings prior to their removal at the surface may prolong drilling time, because shale particles traveling up the well bore break up into smaller and smaller particles, which can expose new surface area of the shale particles to the drilling fluid, which may lead to still further absorption of water, and further degradation.

Shale disintegration also may impact "equivalent circulation density" ("ECD"). ECD generally may be affected by the solids content of the drilling fluid, which may increase if surface solids control equipment cannot remove shale from the drilling fluid. Plastic viscosity (an indicator of size and quantity of solids) is an important parameter in determining drilling rate. Maintenance of appropriate ECD is important in situations where a well is being drilled wherein a narrow tolerance exists between the weight of the drilling fluid needed to control the formation pressure, and the weight of the drilling fluid that will fracture the formation. In such circumstances, minimizing shale degradation generally provides improved control of the density of the drilling fluid.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such extent that the well bore may collapse. Degradation of the shale also may interrupt circulation of the drilling fluid, cause greater friction between the drill string and the well bore, or cause the drill string to become stuck in the well bore. Accordingly, the complications associated with shale swelling during drilling may increase greatly the cost of drilling.

A traditional method of inhibiting shale swelling during drilling to attempt to minimize such complications has been to use an oil-based drilling fluid as opposed to an aqueous-based drilling fluid. However, environmental regulations enacted by numerous countries have limited the use of oil-based drilling fluids.

Another conventional technique used to counteract the propensity of aqueous drilling fluids to interact with reactive shales in the formation involves adding a shale inhibiting component to the aqueous drilling fluid. As referred to herein, the term "shale inhibiting component" refers to a compound that demonstrates a propensity for inhibiting the tendency of shale to absorb water. Amphoteric materials are one type of water-based shale inhibitor that has been used in the past. Amphoteric materials are believed to attach to the shale substrate, thus preventing water ingress. Amphoteric inhibitors may be environmentally undesirable, especially in heavily regulated areas, because they typically demonstrate low biodegradability and high toxicity. Potassium chloride is another conventional shale inhibiting component. Although potassium chloride is widely used as a shale inhibitor in the North Sea, it is considered to be only moderately effective at inhibiting shale swelling. Furthermore, potassium chloride is environmentally unacceptable in other areas of the world, for example, regions such as around the Gulf of Mexico, because its concentration of potassium ions may be troublesome for certain types of marine life, e.g., shrimp. Potassium chloride is also disfavored in regions such as the Middle East where wells are drilled in close proximity to aquifers due to concerns that the potassium chloride will contaminate the aquifer. Polyglycols have also been used as shale inhibitors in water-based drilling fluids, but have not reached satisfactory inhibition levels. Partially hydrolyzed polyacrylamides ("PHPA") have also been utilized in many regions, but these have been found to have undesirable properties in certain circumstances.

SUMMARY OF THE INVENTION

The present invention relates to subterranean drilling operations, and more particularly, to drilling fluids that may be used to drill a well bore in a subterranean formation that may demonstrate improved shale inhibition and methods of using such drilling fluids in subterranean formations.

An example of a method of the present invention is a method of drilling a well bore in a subterranean formation comprising providing a drilling fluid comprising an aqueous-based fluid and a shale inhibiting component comprising a nanoparticle source; and placing the drilling fluid in the well bore in the subterranean formation.

Another example of a method of the present invention is a method of drilling a well bore in a subterranean formation comprising shale comprising providing a drilling fluid comprising an aqueous-based fluid and a shale inhibiting component comprising a nanoparticle source; and drilling the well bore in the subterranean formation using the drilling fluid.

Another example of a method of the present invention is a method of enhancing the shale inhibition of an aqueous-based drilling fluid comprising adding to the drilling fluid a shale inhibiting component comprising a nanoparticle source.

Another example of a method of the present invention is a method of drilling a well bore in a subterranean formation comprising using a drilling fluid that comprises a nanoparticle source.

Another example of a method of the present invention is a method of flocculation comprising providing a fluid comprising suspended particles and adding a shale inhibiting component comprising a nanoparticle source to the fluid comprising suspended particles to form flocculated particles.

An example of a composition of the present invention is a drilling fluid comprising an aqueous-based fluid and a shale inhibiting component comprising a nanoparticle source.

Another example of a composition of the present invention is a composition that inhibits the degradation of shale comprising a shale inhibiting component comprising a nanoparticle source.

Another example of a composition of the present invention is a drilling fluid comprising a nanoparticle source.

The features and advantages of the present invention will be readily apparent to those skilled in the art upon a reading of the description of the exemplary embodiments which follows.

DETAILED DESCRIPTION OF EXEMPLARY EMBODIMENTS

The present invention relates to subterranean drilling operations, and more particularly, to drilling fluids that may be used to drill a well bore in a subterranean formation that may demonstrate improved shale inhibition and methods of using such drilling fluids in subterranean formations.

In certain embodiments, the drilling fluids of the present invention comprise a nanoparticle source. The nanoparticle source, among other things, may provide improved shale inhibition in well bores comprising shale. In another embodiment, the improved drilling fluids of the present invention comprise an aqueous-based fluid, a shale inhibiting component comprising a nanoparticle source, and an optional salt. Other additives suitable for use in conjunction with subterranean drilling operations also may be added to drilling fluids of the present invention if desired. In certain preferred embodiments, the improved drilling fluids of the present invention have a density in the range of from about 7 lbs/gallon to about 22 lbs/gallon.

The aqueous-based fluid component of the drilling fluids of the present invention may comprise fresh water, salt water (e.g., water containing one or more dissolved salts), brine (e.g., saturated salt water), or seawater. Generally, the aqueous-based can be from any source provided that it does not contain an excess of compounds that may adversely affect other components in the drilling fluid. One of ordinary skill in the art with the benefit of this disclosure will recognize which type of aqueous component is appropriate for a particular application.

The shale inhibiting components used in the drilling fluids of the present invention comprise a nanoparticle source that inhibits the degradation of shale without adversely affecting the performance of the drilling fluid. Among other things, the shale inhibiting component comprising a nanoparticle source may prevent the ingress of water into the shale substrate, and thus, inhibit the degradation of the shale. In an exemplary embodiment, the nanoparticle source comprises polyvinyl pyrrolidone, at least a portion of the polyvinyl pyrrolidone is in the form of nanoparticles. In an exemplary embodiment, the polyvinyl pyrrolidone comprises crosslinked polyvinyl pyrrolidone. An example of a suitable shale inhibiting component comprising crosslinked polyvinyl pyrrolidone used in the drilling fluids of the present invention is commercially available under the tradename "VIVIPRINT 540" from International Specialty Products of Wayne, N.J. VIVIPRINT 540 comprises water and about 11% crosslinked polyvinyl pyrrolidone by weight, at least a portion of the polyvinyl pyrrolidone is in the form of nanoparticles. In another exemplary embodiment, the nanoparticle source comprises rubber latex, at least a portion of the rubber latex is in the form of nanoparticles. One of ordinary skill in the art will recognize the suitability of a nanoparticle source comprising rubber latex where use of a drilling fluid may be subject to environmental restrictions, and preferably should make appropriate adjustments to the compositions of the present invention. A variety of nanoparticle sources comprising rubber latex may be used in accordance with the present invention, including both synthetic and natural rubbers in latex form, where such rubber latexes are commercially available as aqueous dispersions and/or emulsions. In an exemplary embodiment, the nanoparticle source comprises emulsion-polymerized copolymers of 1,3-butadiene and styrene. An example of a suitable shale inhibiting component comprising emulsion-polymerized copolymers of 1,3-butadiene and styrene used in the drilling fluids of the present invention is commercially available under the tradename "TECHWAX FL250" from Techwax, Ltd of Newton Aycliffe, United Kingdom. TECHWAX FL250 comprises water and about 68% of emulsion-polymerized copolymers of 1,3-butadiene and styrene by weight, at least a portion of such copolymers is in the form of nanoparticles. In certain exemplary embodiments, the nanoparticle source comprises crosslinked polyvinyl pyrrolidone and emulsion-polymerized copolymers of 1,3-butadiene and styrene. In an exemplary embodiment, the nanoparticle source is present in the drilling fluids of the present invention in an amount in the range of from about 0.0025% to about 5% by volume of the drilling fluid.

Generally, at least a portion of the nanoparticle source comprises nanoparticles having particle sizes that are greater than individual atoms and less than bulk solids. In an exemplary embodiment, at least a portion of the nanoparticle source comprises nanoparticles having an average particle size of less than about 1000 nanometers. In an exemplary embodiment, at least a portion of the nanoparticle source comprises nanoparticles having an average particle size of less than about 400 nanometers.

The shale inhibiting components may be present in the drilling fluids of the present invention without limit, but should be included in an appropriate amount, based on the conditions present in the subterranean formation, to inhibit the degradation of shale. The proper amount of the shale inhibiting component to add may be determined by balancing the cost savings realized by effective inhibition of shale during drilling against the cost of an additional amount of shale inhibitor. One of ordinary skill in the art with the benefit of this disclosure will recognize the appropriate balance for a chosen application.

In several embodiments, the presence of the shale inhibiting components in the drilling fluids of the present invention has been found to measurably improve both the lubricity and the viscosity of the drilling fluids. As a result, reduced amounts of lubricant and viscosifier may be needed.

Optionally, the drilling fluids of the present invention may contain one or more salts. One of ordinary skill in the art with the benefit of this disclosure will recognize the need for caution when combining a salt with a drilling fluid for use in certain regions of the world where such use of a salt may be subject to environmental restriction. One of ordinary skill in the art with the benefit of this disclosure also will recognize where it is desirable to use a dense brine rather than achieve density with a solid weighting agent. Where the use of a salt is permissible, a variety of salts may be used. Examples of suitable salts include potassium chloride, sodium chloride, potassium formate, potassium carbonate, calcium chloride, and calcium bromide. In certain embodiments, a mixture of suitable salts may be used. In certain embodiments, suitable salts are present in the drilling fluids of the present invention in an amount in the range of from about 5 pounds per barrel ("ppb") to about the salt saturation limit of the drilling fluid. Where potassium chloride is added to a drilling fluid, it may detrimentally affect the performance of a shale inhibiting component comprising emulsion-polymerized copolymers of 1,3-butadiene and styrene.

As will be recognized by those skilled in the art, other additives suitable for use in subterranean well bore drilling operations also may be present in the drilling fluids of the present invention if desired, including, inter alia, antifoams, biocides, bridging agents, corrosion control agents, dispersants, flocculants, fluid loss additives, foamers, $H_2S$ scavengers, lubricants, oxygen scavengers, scale inhibitors, viscosifiers, and weighting agents. One of ordinary skill in the art with the benefit of this disclosure will be able to determine if any of these such additives are needed for a given application. Where sodium hydroxide is added to a drilling fluid as a buffer, it may detrimentally affect the performance of a shale inhibiting component comprising emulsion-polymerized copolymers of 1,3-butadiene and styrene.

Additionally, the shale inhibiting component also may act as a flocculant. For example, the shale inhibiting component may cause shale particles traveling in the well bore to agglomerate into larger particles, whereby the surface control equipment may more effectively remove such particles from the drilling fluid.

In certain embodiments, the shale inhibiting component of the present invention may be used as a flocculant. Flocculants may be useful in a wide range of applications, including, but not limited to, drilling fluid flocculation, water/sewage treatment, tunneling, water well and utilities drilling, treatment of mining and other waste fluids, and the like. For example, in certain embodiments, it may be desired to remove particles suspended in a waste fluid (e.g., wastewater), whereby the shale inhibiting component comprising a nanoparticle source may be added to the waste fluid. Among other things, the presence of the shale inhibiting component comprising a nanoparticle source in the waste fluid may cause particles suspended in the waste fluid to flocculate into larger particles. The flocculated particles may then be removed from the fluid by any suitable means, for example, by mechanical means (e.g., centrifugation or filtration) or by sedimentation. Among other benefits, the shale inhibiting component comprising nanoparticles provides a number of advantages over current flocculants, including reduced environment impact due to higher efficiency, lower toxicity, and greater biodegradability.

The shale inhibiting component comprising a nanoparticle source may be added to the waste fluid without limit, but should be included in an appropriate amount, based on the particular application, to flocculate the suspended particles. One of ordinary skill in the art with the benefit of this disclosure will recognize the appropriate amount of the shale inhibiting component to include for a chosen application. In an exemplary embodiment, the shale inhibiting component comprising a nanoparticle source may be added to the fluid comprising suspended particles so that the nanoparticle source is present in such fluid in an amount in the range of from about 0.0025% to about 0.5% by volume.

An example drilling fluid of the present invention comprises an aqueous-based fluid and a shale inhibiting component comprising a nanoparticle source. Another example of a drilling fluid of the present invention is a composition of fresh water and 3% VIVIPRINT 540, which comprises a nanoparticle source, by volume of the fresh water. Another example of a drilling fluid of the present invention is a composition of fresh water, 3% VIVIPRINT 540, which comprises a nanoparticle source, by volume of the fresh water, and 10.5 ppb potassium chloride. Another example of a drilling fluid of the present invention comprises water, 28 ppb potassium chloride, 0.4 ppb caustic soda, 62 ppb barite, 7 ppb of water-soluble polymers, and 3% VIVIPRINT 540, which comprises a nanoparticle source, by volume. Another example of a drilling fluid of the present invention comprises fresh water and 3% TECHWAX FL250, which comprises a nanoparticle source, by volume of the fresh water.

An example of a method of the present invention is a method of drilling a well bore in a subterranean formation comprising providing a drilling fluid comprising an aqueous-based fluid and a shale inhibiting component comprising a nanoparticle source; and placing the drilling fluid in the well bore in the subterranean formation.

Another example of a method of the present invention is a method of drilling a well bore in a subterranean formation comprising shale comprising providing a drilling fluid comprising an aqueous-based fluid and a shale inhibiting component comprising a nanoparticle source; and drilling the well bore in the subterranean formation using the drilling fluid.

Another example of a method of the present invention is a method of flocculation comprising providing a fluid comprising suspended particles and adding a shale inhibiting component comprising a nanoparticle source to the fluid comprising suspended particles to form flocculated particles.

To facilitate a better understanding of the present invention, the following examples of exemplary embodiments are given. In no way should the following examples be read to limit the scope of the invention.

EXAMPLES

Example 1

A shale recovery test was performed on samples of various fluids, in order to compare the relative inhibition each fluid demonstrated toward a particular shale sample. This test was intended to mimic the exposure of drilled cuttings to a particular drilling fluid during transport to the surface through a well bore annulus.

A sample of dried shale was ground and sieved through both a 4 mm sieve and a 2 mm sieve. Ground shale particles that passed through the 4 mm sieve but collected on the 2 mm sieve, e.g., shale particles that were sized less than 4 mm but greater than 2 mm, were selected for use in this particular test. For each fluid to be tested, a 20 gram sample of sized shale was weighed and selected.

Next, approximately 350 mL of each fluid to be tested was poured into a bottle. The 20 gram sized shale sample was added to the fluid, and the bottle was capped and shaken to ensure even distribution. The sample was then placed in an oven and hot rolled at 160° F. for 16 hours. When the 16 hour hot roll was complete, the sample was cooled to room temperature.

Next, a large quantity of approximately 20 ppb potassium chloride solution was prepared. The contents of the sample bottle were then poured onto a 500 micrometer sieve. The inside of the sample bottle was carefully rinsed with the potassium chloride solution, and once more poured onto the 500 micrometer sieve. The bottle was repeatedly rinsed and poured until all shale was removed from the bottle.

Next, the shale retained by the 500 micrometer sieve was carefully washed with the potassium chloride solution. Special care was taken to ensure that none of the sample spilled over the side of the sieve. The washed particles of shale were then washed with water to remove any remnants of the potassium chloride brine. A clean, dry piece of non-absorbent paper was placed on a flat surface, and the 500 micrometer sieve was turned upside down above it. The sieve was tapped to remove the washed particles of shale. A brush was used to remove any shale particles left on the sieve.

The sample was then placed in a pre-weighed Petri dish and transferred to a pre-heated oven at 250° F. to dry to a constant weight. Having dried, the shale sample was then weighed. The percentage recovery of shale for each fluid tested was then determined by the following calculation:

$$\text{Percent Recovered} = \frac{\text{weight in grams of dried shale recovered}}{20 \text{ grams}} \times 100$$

where the "20 grams" in the denominator refers to the weight of the original shale sample.

The first shale swelling inhibition test involved five different fluids and a shale sample consisting of London clay. The test was conducted according to the above procedure. Table 1 below lists the percentage of shale recovery for each fluid tested.

TABLE 1

| Fluid Description | Percent Shale Recovered |
| --- | --- |
| Fluid Sample No. 1 | 2.3 |
| Fluid Sample No. 2 | 13.0 |
| Fluid Sample No. 3 | 96.1 |
| Fluid Sample No. 4 | 50.8 |
| Fluid Sample No. 5 | 6.7 |

Fluid Sample No. 1 (comparative) consists of an aqueous solution of water and 10.5 ppb potassium chloride. The shale recovery was 2.3%.

Fluid Sample No. 2 (comparative) consists of an aqueous solution containing water, 10.5 ppb potassium chloride, and 3% of a conventional amphoteric inhibitor. The shale recovery was 13.0%.

Fluid Sample No. 3 consists of an aqueous solution containing water, 10.5 ppb potassium chloride, and 3% VIVIPRINT 540. The VIVIPRINT 540 comprises a nanoparticle source. The shale recovery was 96.1%.

Fluid Sample No. 4 (comparative) consists of an aqueous solution containing water, 10.5 ppb potassium chloride, and 11% sodium silicate. The shale recovery was 50.8%.

Fluid Sample No. 5 (comparative) consists of an aqueous solution containing water, 10.5 ppb potassium chloride, and 3% polyalkyl glycol. The shale recovery was 6.7%.

The above test demonstrates, inter alia, that Fluid Sample No. 3, a drilling fluid of the present invention comprising a shale inhibiting component comprising a nanoparticle source, provides improved shale inhibition. Although a shale inhibiting component comprising crosslinked polyvinyl pyrrolidone was used in these experiments as an embodiment of the improved shale inhibiting components used in the drilling fluids of the present invention, in no way should the invention be read to be limited by its composition. Numerous shale inhibiting components comprising nanoparticle sources are suitable and within the scope of the present invention.

Example 2

A second shale swelling inhibition test was performed on nine different fluids using a sample of shale from Kristin Field, Norway. The test was conducted according to the procedure described in Example 1 above. Table 2 below lists the percentage of shale recovery for each fluid tested.

TABLE 2

| Fluid Description | Percent Shale Recovered |
| --- | --- |
| Fluid Sample No. 6 | 32.0 |
| Fluid Sample No. 7 | 42.8 |
| Fluid Sample No. 8 | 40.9 |
| Fluid Sample No. 9 | 34.6 |
| Fluid Sample No. 10 | 40.0 |
| Fluid Sample No. 11 | 45.9 |
| Fluid Sample No. 12 | 50.0 |
| Fluid Sample No. 13 | 54.5 |
| Fluid Sample No. 14 | 83.2 |
| Fluid Sample No. 15 | 81.2 |

Fluid Sample No. 6 (comparative) consists solely of water. The shale recovery was 32.0%.

Fluid Sample No. 7 (comparative) consists of an aqueous solution containing water and 35 ppb potassium chloride. The shale recovery was 42.8%.

Fluid Sample No. 8 (comparative) consists of an aqueous solution containing water, 35 ppb potassium chloride, and 3% polyalkylene glycol by volume. The shale recovery was 40.9%.

Fluid Sample No. 9 (comparative) consists of an aqueous solution containing water, 35 ppb potassium chloride, and 13% modified silicate by volume. The shale recovery was 34.6%.

Fluid Sample No. 10 (comparative) consists of an aqueous solution containing water, 35 ppb potassium chloride, and 12% sodium silicate by volume. The shale recovery was 40.0%.

Fluid Sample No. 11 (comparative) consists of an aqueous solution containing water, 35 ppb potassium chloride, and 3% amphoteric shale inhibitor by volume. The shale recovery was 45.9%.

Fluid Sample No. 12 (comparative) consists of an aqueous solution containing water, 35 ppb potassium chloride, and 10 ppb gypsum. The shale recovery was 50.0%.

Fluid Sample No. 13 (comparative) consists of an aqueous solution containing 35 ppb potassium chloride in 80 ppb sodium chloride. The shale recovery was 54.5%.

Fluid Sample No. 14 consists of an aqueous solution containing water, 35 ppb potassium chloride, and 3% VIVIPRINT 540 by volume. The VIVIPRINT 540 comprises a shale inhibiting component comprising a nanoparticle source. The shale recovery was 83.2%.

Fluid Sample No. 15 consists of water and 3% VIVIPRINT 540 by volume. The VIVIPRINT 540 comprises a shale inhibiting component comprising a nanoparticle source. The shale recovery was 81.2%.

Thus, Example 2 demonstrates, inter alia, that Fluid Sample No. 14 and Fluid Sample No. 15, which are drilling fluids of the present invention comprising a shale inhibiting component comprising a nanoparticle source, demonstrate improved shale inhibition.

Example 3

A shale inhibition test was next performed on eight different fluids using a sample of shale from the Mittelplatte Field in Germany. The shale sample comprised 14% quartz, 2% alkali feldspar, 12% calcite, 1% pyrite, 68% of a mixture of illite and smectite, and 2% kaolinite. A cation exchange capacity ("CEC") test on the material, performed in accordance with API standard 13-B1, showed the shale to be highly reactive. The test was conducted according to the procedure described in Example 1 above. Table 3 below lists the percentage of shale recovery for each fluid tested.

TABLE 3

| Fluid Description | Percent Shale Recovered |
|---|---|
| Fluid Sample No. 16 | 14.2 |
| Fluid Sample No. 17 | 33.6 |
| Fluid Sample No. 18 | 62.7 |
| Fluid Sample No. 19 | 67.1 |
| Fluid Sample No. 20 | 90.2 |
| Fluid Sample No. 21 | 87.5 |

Fluid Sample No. 16 (comparative) consists of an aqueous solution containing water, 10 ppb gypsum, and 0.3 ppb caustic soda. The shale recovery was 14.2%.

Fluid Sample No. 17 (comparative) consists of an aqueous solution containing water, 28 ppb potassium chloride, and 2% amphoteric shale inhibitor by volume. The shale recovery was 33.6%.

Fluid Sample No. 18 (comparative) consists of an aqueous solution containing water, 28 ppb potassium chloride, and 3% oxyalkylated butanol by volume. The shale recovery was 62.7%.

Fluid Sample No. 19 (comparative) consists of an aqueous solution containing water, 28 ppb potassium chloride, and 3% polyalkyl glycol by volume. The shale recovery was 67.1%.

Fluid Sample No. 20 consists of an aqueous solution containing water, 28 ppb potassium chloride, and 3% VIVIPRINT 540 by volume. The VIVIPRINT 540 comprises a shale inhibiting component comprising a nanoparticle source. The shale recovery was 90.2%.

Fluid Sample No. 21 (comparative) consists of water, 28 ppb potassium chloride, and 12% sodium silicate by volume. The shale recovery was 87.5%.

Thus, Example 3 demonstrates, inter alia, that Fluid Sample No. 20, a drilling fluid of the present invention comprising a shale inhibiting component comprising a nanoparticle source, provides improved shale recovery.

Example 4

A fourth shale inhibition test was performed on four different fluids using a shale sample of London clay. The test was conducted according to the procedure described in Example 1 above. However, in addition to a 500 micrometer sieve, the fluid samples were first sieved through a 2 millimeter sieve and a 850 micrometer sieve, respectively. Table 4 below lists the percentage of shale recovery for each fluid tested.

TABLE 4

| Fluid Description | Percent Shale Recovered (2 mm Sieve) | Percent Shale Recovered (850 μm Sieve) | Percent Shale Recovered (500 μm Sieve) |
|---|---|---|---|
| Fluid Sample No. 22 | 0 | 0 | 0 |
| Fluid Sample No. 23 | 0 | 0 | 5.6 |
| Fluid Sample No. 24 | 94.2 | 2.1 | 0.6 |
| Fluid Sample No. 25 | 145.9 | — | — |

It is believed that, where certain concentrations of a shale inhibiting component comprising TECHWAX FL250 are present in the fluid sample, the shale recovery may be greater than 100% because the recovery may include portions of the emulsion-polymerized copolymers of 1,3-butadiene and styrene present in the TECHWAX FL250 as well as shale.

Fluid Sample No. 22 (comparative) consists solely of water. The shale recovery was 0% for all sieves.

Fluid Sample No. 23 consists of an aqueous solution containing water and 1% TECHWAX FL250 by volume. The TECHWAX FL250 comprises a shale inhibiting component comprising a nanoparticle source. The shale recovery was 0% for the 2 millimeter sieve, 0% for the 850 micrometer sieve, and 5.6% for the 500 micrometer sieve.

Fluid Sample No. 24 consists of an aqueous solution containing water and 3% TECHWAX FL250 by volume. The TECHWAX FL250 comprises a shale inhibiting component comprising a nanoparticle source. The shale recovery was 94.2% for the 2 millimeter sieve, 2.1% for the 850 micrometer sieve, and 0.6% for the 500 micrometer sieve. Moreover, visual observation of the recovered shale indicated that the shale was flocculated into miniature balls that did not break apart when compressed.

Fluid Sample No. 25 consists of an aqueous solution containing water and 5% TECHWAX FL250 by volume. The TECHWAX FL250 comprises a shale inhibiting component comprising a nanoparticle source. The shale recovered was 145.9% for the 2 millimeter sieve. Moreover, visual observation of the recovered shale indicated that the shale was flocculated into miniature balls that did not break apart when compressed.

Thus, Example 4 indicates, inter alia, that Fluid Sample No. 24 and Fluid Sample No. 25, drilling fluids of the present invention comprising a shale inhibiting component comprising a nanoparticle source, provide desirable shale recovery.

Example 5

A fifth shale inhibition test was performed on four different fluid samples using a shale sample of London clay. This test was conducted according to the procedure described in Example 1 above; however, instead of a 500 micrometer sieve, a 2 millimeter sieve was used. Table 5 below lists the percentage of shale recovery for each fluid tested.

TABLE 5

| Fluid Description | Percent Shale Recovered |
|---|---|
| Fluid Sample No. 26 | 1.65 |
| Fluid Sample No. 27 | 57.8 |
| Fluid Sample No. 28 | N/D |
| Fluid Sample No. 29 | 118.9 |

It is believed that, where certain concentrations of a shale inhibiting component comprising TECHWAX FL250 are present in the fluid sample, the shale recovery may be greater than 100% because the recovery may include portions of the emulsion-polymerized copolymers of 1,3-butadiene and styrene present in the TECHWAX FL250 as well as shale.

Fluid Sample No. 26 (comparative) consists of an aqueous solution containing water and 30 ppb potassium chloride. The shale recovery was 1.65%.

Fluid Sample No. 27 consists of an aqueous solution containing water and 3% VIVIPRINT 540 by volume. The VIVIPRINT 540 comprises a shale inhibiting component comprising a nanoparticle source. The shale recovery was 57.8%.

Fluid Sample No. 28 consists of an aqueous solution containing water, 5% TECHWAX FL250 by volume, and 30 ppb potassium chloride. The TECHWAX FL250 comprises a shale inhibiting component comprising a nanoparticle source. The shale recovery was not determinable. It is believed that the shale recovery was not determinable for this fluid sample because the TECHWAX FL250 reacted with the potassium chloride to form a rubbery mass thereby preventing a determination of the shale recovery.

Fluid Sample No. 29 consists of an aqueous solution containing water, 3% VIVIPRINT 540 by volume, and 5% TECHWAX FL250 by volume. The TECHWAX FL250 comprises a shale inhibiting component comprising a nanoparticle source. The VIVIPRINT 540 comprises a shale inhibiting component comprising a nanoparticle source. The shale recovery was 118.9%.

Example 5 indicates, inter alia, that Fluid Sample 29, a drilling fluid of the present invention comprising a shale inhibiting component comprising more than one nanoparticle source, provides a desirable level of shale recovery.

Example 6

A shale accretion test was performed on 8 samples of shale from the Mittelplatte field in Germany. The shale sample comprised 14% quartz, 2% alkali feldspar, 12% calcite, 1% pyrite, 68% of a mixture of illite and smectite, and 2% kaolinite. A CEC test on the material showed the shale to be highly reactive. The test was performed in accordance with the following procedure. Shale from the Mittelplatte field was collected and dried overnight at 110° C. After cooling, the shale was broken down and sieved to obtain "chips" greater than 2 mm in diameter, but less than 4 mm in diameter.

Hot roll cells were set up containing solid pre-weighed cylindrical steel bars with dimensions of 127 mm by 25 mm diameter. Sample compositions of each fluid to be tested were then added to the cells until the fluid height equaled the top of the bar. Sixty grams of Mittelplatte shale chips were then added to each hot roll cell, and gently mixed. The cells were capped, and rolled for thirty minutes at room temperature. Next, the cells were opened, and the bars were carefully removed. The bars were allowed to drain for ten minutes, then the bars were weighed. Shale accretion for each comparative sample was then determined as the net weight of shale added to the bar. The results are reported in Table 6 below.

TABLE 6

| Fluid Description | Shale Accretion (grams) |
|---|---|
| Fluid Sample No. 30 | 0.87 |
| Fluid Sample No. 31 | 1.78 |
| Fluid Sample No. 32 | 1.08 |
| Fluid Sample No. 33 | 1.84 |
| Fluid Sample No. 34 | 5.27 |
| Fluid Sample No. 35 | 9.14 |
| Fluid Sample No. 36 | 19.52 |

Fluid Sample No. 30 (comparative) consists of an aqueous solution containing water, 28 ppb potassium chloride, 0.5 ppb caustic soda, 65 ppb barite, and 7 ppb of water-soluble polymers. The shale accretion was 0.87 grams.

Fluid Sample No. 31 (comparative) consists of an aqueous solution containing water, 28 ppb potassium chloride, 0.4 ppb caustic soda, 62 ppb barite, 7 ppb of water-soluble polymers, and 2% amphoteric shale inhibitor by volume. The shale accretion was 1.78 grams.

Fluid Sample No. 32 (comparative) consists of an aqueous solution containing water, 28 ppb potassium chloride, 0.4 ppb caustic soda, 62 ppb barite, 7 ppb of water-soluble polymers, and 4% oxyalkylated butanol by volume. The shale accretion was 1.08 grams.

Fluid Sample No. 33 consists of an aqueous solution containing water, 28 ppb potassium chloride, 0.4 ppb caustic soda, 62 ppb barite, 7 ppb of water-soluble polymers, and 3% VIVIPRINT 540 by volume. The VIVIPRINT 540 comprises a shale inhibiting component comprising a nanoparticle source. The shale accretion was 1.84 grams.

Fluid Sample No. 34 (comparative) consists of an aqueous solution containing water, 28 ppb potassium chloride, 38 ppb barite, 7 ppb of water-soluble polymers, and 14.67% sodium silicate by volume. The shale accretion was 5.27 grams.

Fluid Sample No. 35 (comparative) consists of an aqueous solution containing water, 0.4 ppb caustic soda, 25 ppb bentonite, and 10 ppb gypsum. The shale accretion was 9.14 grams.

Fluid Sample No. 36 (comparative) consists of an aqueous solution containing water, 35 ppb sodium chloride, 58 ppb barite, and 11 ppb of PHPA. The shale accretion was 19.52 grams.

Thus, Example 6 demonstrates that Fluid Sample No. 33, a drilling fluid of the present invention comprising a shale inhibiting component comprising a nanoparticle source, provides reduced shale accretion as compared to PHPA and sodium silicate.

Example 7

A "slake durability" test measures the inhibitive qualities of a water-based drilling fluid under field conditions. Sample compositions of three different fluids were prepared, and exposed to shale from the Alba field in the North Sea, according to the following procedure. First, the shale from the Alba field was ground and sieved until over 400 grams of shale sized to 4-8 mm had been collected. Next, each of four pre-weighed mesh covered cylindrical cells ("cages") received 100 grams of dried shale. The four cages were then placed into baths containing 2.5 liters of the sample composition to be tested. The cages were connected to each other, and to a motor, so that each cage would be rotated. The cages were then rotated for the next 4 hours at 20 rpm at room temperature. The cages were then removed from the baths and briefly washed under running water to remove any remaining components of the sample composition. The cages, and the shale still within them, were then dried for at least 16 hours at 105° C. The cages, including the shale, were then weighed. The percentage recovery of shale for each sample composition was then determined by the following calculation:

$$\text{Percent Recovered} = \frac{\text{final dry weight}}{\text{initial dry weight}} \times 100,$$

where the "initial dry weight" is the weight of the shale placed into a cage, and the "final dry weight" is the total weight of the cage plus dried shale, minus the weight of the empty cage. The results are tabulated below in Table 7.

TABLE 7

| Fluid Description | Slake Durability |
|---|---|
| Fluid Sample No. 37 | 23.3% |
| Fluid Sample No. 38 | 26.6% |
| Fluid Sample No. 39 | 37.0% |

Fluid Sample No. 37 (comparative) comprises an aqueous solution containing water and 42 ppb potassium chloride. The slake durability was 23.3%.

Fluid Sample No. 38 (comparative) comprises an aqueous solution containing water and 48 ppb potassium formate. The slake durability was 26.6%.

Fluid Sample No. 39 comprises an aqueous solution containing water, 42 ppb potassium chloride, and 3% VIVIPRINT 540 by volume. The VIVIPRINT 540 comprises a shale inhibiting component comprising a nanoparticle source. The slake durability was 37.0%.

Thus, Example 7 demonstrates that Fluid Sample No. 39, a drilling fluid of the present invention comprising a shale inhibiting component comprising a nanoparticle source, provides improved shale recovery.

Example 8

The presence of a shale inhibitor within the drilling fluid should have no adverse effect on any other physical or chemical properties of the drilling fluid. Accordingly, a test was performed in which VIVIPRINT 540 was added to a drilling fluid sample, to identify the effect on the original properties of the fluid. The VIVIPRINT 540 comprises a shale inhibiting component comprising a nanoparticle source.

Fluid Sample No. 40 (comparative) consists of a mixture of 0.448 barrels of sodium chloride brine and 0.418 barrels of potassium chloride brine. To this mixture was added caustic soda in an amount of 0.1 ppb; 8.0 ppb N-DRIL HT PLUS; 3.0 ppb N-VIS P PLUS; 63 ppb BARACARB® 50; and 21 ppb BARACARB® 5. Finally, 3% water by volume was added. N-DRIL HT PLUS is a fluid loss agent commercially available from Halliburton Energy Services, Inc., at various locations. N-VIS P PLUS is a viscosifier commercially available from Halliburton Energy Services, Inc., at various locations. BARACARB® 50, a weighting agent, and BARACARB® 5, a bridging agent, are both commercially available from Halliburton Energy Services, Inc., at various locations.

Fluid Sample No. 41 consists of a mixture of 0.448 barrels of sodium chloride brine and 0.418 barrels of potassium chloride brine. To this mixture was added caustic soda in an amount of 0.1 ppb; 8.0 ppb N-DRIL HT PLUS; 3.0 ppb N-VIS P PLUS; 63 ppb BARACARB® 50; and 21 ppb BARACARB® 5. Finally, 3% VIVIPRINT 540 by volume was added.

Table 8 below lists measurements of the rheology of both Fluid Sample No. 40 and Fluid Sample No. 41 which were determined at 120° F.

TABLE 8

| Fluid Description | Plastic Viscosity (cP) | Yield Point (lb/100 ft$^2$) | 10 Second Gel (lb/100 ft$^2$) | 10 Minute Gel (lb/100 ft$^2$) |
|---|---|---|---|---|
| Fluid Sample No. 40 | 24 | 47 | 12 | 13 |
| Fluid Sample No. 41 | 29 | 52 | 11 | 12 |

Table 9 below lists dial readings taken from a Fann Viscometer set at different speeds for both Fluid Sample No. 40 and Fluid Sample No. 41 while the samples were at 120° F.

TABLE 9

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 40 | 95 | 71 | 60 | 44 | 14 | 12 |
| Fluid Sample No. 41 | 110 | 81 | 67 | 48 | 13 | 11 |

Table 10 below lists physical properties of Fluid Samples No. 40 and No. 41 after both samples had been hot rolled for 16 hours at 250° F. and then cooled to 120° F., except that the API Fluid Loss test was performed at room temperature, in accordance with API 13B-1.

TABLE 10

| Fluid Description | Plastic Viscosity (cP) | Yield Point (lb/100 ft$^2$) | 10 Second Gel (lb/100 ft$^2$) | 10 Minute Gel (lb/100 ft$^2$) | pH | API Fluid Loss (mL/30 min) |
|---|---|---|---|---|---|---|
| Fluid Sample No. 40 | 23 | 53 | 13 | 14 | 10.0 | 1.8 |
| Fluid Sample No. 41 | 31 | 58 | 10 | 12 | 10.1 | 1.5 |

Table 11 below lists dial readings taken from a Fann Viscometer set at different speeds for Fluid Samples No. 40 and No. 41 after both samples had been hot rolled for 16 hours at 250° F. and then cooled to 120° F.

TABLE 11

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 40 | 99 | 76 | 63 | 48 | 17 | 13 |
| Fluid Sample No. 41 | 120 | 89 | 75 | 54 | 14 | 10 |

Accordingly, Example 8 demonstrates that Fluid Sample No. 41, a drilling fluid of the present invention comprising a shale inhibiting component comprising a nanoparticle source, provides increased viscosity and no loss of properties.

Example 9

The presence of a shale inhibitor within the drilling fluid should preferably have no adverse effect on any other physical or chemical properties of the drilling fluid. Accordingly, a test was performed in which TECHWAX FL250 was added to a drilling fluid sample, to identify the effect on the original properties of the fluid. The TECHWAX FL250 comprises a shale inhibiting component comprising a nanoparticle source.

Fluid Sample No. 42 (comparative) consists of 0.877 barrels of water. To this mixture was added 0.5 lbs of sodium hydroxide, 1 lb of BARAZAN® D PLUS, 4 lbs of DEXTRID® E, 2 lbs of PAC-R, 90 lbs of Barite, and 1 lb of OXYGON. BARAZAN® D PLUS is a visosifier commercially available from Halliburton Energy Services, Inc., at various locations. DEXTRID® E is a fluid loss control agent commercially available from Halliburton Energy Services, Inc., at various locations. PAC-R is a fluid loss control agent and viscosifier commercially available from Halliburton Energy Services, Inc., at various locations. OXYGON is an oxygen scavenger commercially available from Halliburton Energy Services, Inc., at various locations.

Fluid Sample No. 43 consists of 0.877 barrels of water. To this mixture was added 0.5 lbs of sodium hydroxide, 1 lb of BARAZAN® D PLUS, 4 lbs of DEXTRID® E, 2 lbs of PAC-R, 90 lbs of Barite, 1 lb of OXYGON, and 17.5 pounds of TECHWAX FL250.

Table 12 below lists measurements of the rheology of both Fluid Sample No. 42 and Fluid Sample No. 43 which were determined at 120° F.

TABLE 12

| Fluid Description | Plastic Viscosity (cP) | Yield Point (lb/100 ft$^2$) | 10 Second Gel (lb/100 ft$^2$) | 10 Minute Gel (lb/100 ft$^2$) | pH |
|---|---|---|---|---|---|
| Fluid Sample No. 42 | 35 | 107 | 22 | 24 | 11.31 |
| Fluid Sample No. 43 | 18 | 136 | 29 | 33 | 12.49 |

Table 13 below lists dial readings taken from a Fann Viscometer set at different speeds for both Fluid Sample No. 42 and Fluid Sample No. 43 while the samples were at 120° F.

TABLE 13

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 42 | 177 | 142 | 124 | 94 | 29 | 22 |
| Fluid Sample No. 43 | 172 | 154 | 134 | 108 | 39 | 30 |

Table 14 below lists physical properties of Fluid Samples No. 42 and No. 43 after both samples had been hot rolled for 16 hours at 250° F. and then cooled to 120° F.

TABLE 14

| Fluid Description | Plastic Viscosity (cP) | Yield Point (lb/100 ft$^2$) | 10 Second Gel (lb/100 ft$^2$) | 10 Minute Gel (lb/100 ft$^2$) | pH | API Fluid Loss (cc/30 min) | Lubricity (cF) |
|---|---|---|---|---|---|---|---|
| Fluid Sample No. 42 | 31 | 91 | 18 | 23 | 9.57 | 16 | 0.16 |
| Fluid Sample No. 43 | 20 | 161 | 37 | 43 | 10.39 | 16 | 0.16 |

Table 15 below lists dial readings taken from a Fann Viscometer set at different speeds for Fluid Samples No. 42 and No. 43 after both samples had been hot rolled for 16 hours at 250° F. and then cooled to 120° F.

TABLE 15

| Fluid Description | Viscosity dial reading at 600 rpm | Viscosity dial reading at 300 rpm | Viscosity dial reading at 200 rpm | Viscosity dial reading at 100 rpm | Viscosity dial reading at 6 rpm | Viscosity dial reading at 3 rpm |
|---|---|---|---|---|---|---|
| Fluid Sample No. 42 | 153 | 122 | 105 | 82 | 25 | 18 |
| Fluid Sample No. 43 | 201 | 181 | 163 | 135 | 56 | 44 |

Accordingly, Example 9 demonstrates that Fluid Sample No. 43, a drilling fluid of the present invention comprising a shale inhibiting component comprising a nanoparticle source, provides increased viscosity without adversely impacting other properties of the drilling fluid.

Example 10

A linear swell test measures the swelling tendency of shales in different fluid solutions. Shale from the Mittelplatte field in Germany was exposed to sample compositions of four different fluids. The shale sample comprised 14% quartz, 2% alkali feldspar, 12% calcite, 1% pyrite, 68% of a mixture of illite and smectite, and 2% kaolinite. A CEC test on the material showed the shale to be highly reactive. The test was performed according to the following procedure. First, the Mittelplatte shale was dried overnight in an oven set at 100° C. The next day, the dried shale was ground using a mortar and pestle until the shale had been pulverized. The shale was then sieved through a 200 mesh sieve until a volume sufficient for the test had been collected. Five percent water by weight was added, and mixed with the sieved shale.

Next, twenty grams of shale were weighed out four times, once for each fluid to be tested. Each of the ground, sieved shale samples was then reconstituted through the use of a hydraulic compactor unit, producing four compacted "cores" of shale. Each compacted core was then laterally confined within a porous sleeve to minimize radial swelling once exposed to a fluid sample. The compacted, sleeved cores were then placed in cups filled with a particular fluid sample, and the resultant linear swelling was recorded by a transducer and displayed graphically on an adjacent monitor. The test was permitted to continue until all four swelling curves reached a plateau, indicating that no further swelling would occur.

Fluid Sample No. 44 (comparative) consists of an aqueous solution containing water, 0.4 ppb caustic soda, 25 ppb bentonite, and 10 ppb gypsum. The linear swelling of this sample was 27.5%.

Fluid Sample No. 45 (comparative) consists of an aqueous solution containing water, 28 ppb potassium chloride, 0.4 ppb caustic soda, 62 ppb barite, 7 ppb of water-soluble polymers, and 2% amphoteric shale inhibitor by volume. The linear swelling of this sample was 16.5%.

Fluid Sample No. 46 (comparative) consists of an aqueous solution containing water, 28 ppb potassium chloride, 0.4 ppb caustic soda, 62 ppb barite, 20 ppb of water-soluble polymers, and 4% oxyalkylated butanol by volume. The linear swelling of this sample was 14.2%.

Fluid Sample No. 47 consists of an aqueous solution containing water, 28 ppb potassium chloride, 0.4 ppb caustic soda, 62 ppb barite, 7 ppb of water-soluble polymers, and 3%

VIVIPRINT 540 by volume. The VIVIPRINT 540 comprises a shale inhibiting component comprising a nanoparticle source. The linear swelling of this sample was 15.1%.

Accordingly, Example 10 demonstrates that Fluid Sample No. 47, a drilling fluid of the present invention comprising a shale inhibiting component comprising a nanoparticle source, is a suitable shale inhibitor.

Example 11

The environmental acceptability of aqueous drilling and workover fluids is typically related to the toxicity, biodegradability, and bio-accumulation potential of individual products. Polyvinyl pyrrolidones have been used widely in the health and personal care industries since the 1950s as viscosifiers for synthetic blood plasma and haircare products. Accordingly, polyvinyl pyrrolidones are known to pose minimal risk to humans when inhaled or injected. To further quantify the low toxicity of compositions of the present invention, a preferred shale inhibiting component used with the fluid systems of the present invention was subjected to a battery of environmental tests, the results of which are reported in Table 16 below.

TABLE 16

|  | Sediment Toxicity [corophium volutator] (mg/L) | Aquatic Toxicity [skeletonema] (mg/L) | Aquatic Toxicity [acartia tonsa] (mg/L) | Aquatic Toxicity [juvenile turbot] (mg/L) | Bio-degradability | Bio-accumulation |
|---|---|---|---|---|---|---|
| Sample Composition No. 48 | >10,000 | 89.7 | 972 | 960 | 29% | Low |

Sample Composition No. 48 consists of 100% VIVIPRINT 540. The VIVIPRINT 540 comprises a shale inhibiting component comprising a nanoparticle source.

The sediment toxicity test was carried out in accordance with the PARCOM 1995 protocol, and determines the shale inhibiting component's $LC_{50}$ when exposed to the species *corophium volutator*—e.g., the concentration of the shale inhibiting component that is estimated to be lethal to 50% of *corophium volutator*. To satisfy the testing requirements, a component must demonstrate an $LC_{50}$ greater than 10 mg/L. The $LC_{50}$ of Sample Composition No. 48 as determined to be greater than 10,000 mg/L—i.e., the shale inhibiting component is not lethal to 50% of the test species unless the concentration of the shale inhibiting component exceeds 10,000 mg/L.

The aquatic toxicity test on the species *skeletonema costatum* was carried out in accordance with the ISO/DIS 10253 protocol, and determines the shale inhibiting component's $EC_{50}$ when it is administered to a member of the species *skeletonema costatum*. The aquatic toxicity test on the species *acartia tonsa* was carried out in accordance with the ISO/TC147/SC5/WG2 protocol, and measures the shale inhibiting component's $LC_{50}$ when it is administered to a member of that species. The aquatic toxicity test on a species of juvenile turbot was carried out in accordance with the OSPARCOM 1995 OECD 203 protocol, and measures the shale inhibiting component's $LC_{50}$ when it is administered to a juvenile turbot. To satisfy the testing requirements, a component must demonstrate an $LC_{50}$ greater than 10 mg/L. The $EC_{50}$ for *skeletonema* was determined to be 89.7 mg/L, the $LC_{50}$ for *acartia tonsa* was determined to be 972 mg/L, and the $LC_{50}$ for juvenile turbot was found to be 960 mg/L.

The biodegradability test was conducted according to the OECD 306 protocol and measures the decomposition of the shale inhibiting component by bacteria or other living organisms over 28 days. The biodegradability of Sample Composition No. 48 was found to be 29%, which satisfies the testing requirement that the biodegradability exceed 20%. Accordingly, Sample Composition No. 48 merits a rating of "inherently biodegradable" under the Oslo and Paris Commission ("OSPARCOM") Harmonized Offshore Chemical Notification Format.

The bioaccumulation test was conducted according to the OECD 117 protocol. Generally speaking, the test partitions a sample composition between octanol and water, determines the concentration of the sample composition in each phase, and produces a logarithm of the partition coefficient between the two phases. The bioaccumulation of Sample Composition No. 48 was found to be below the detection limits of the measuring equipment.

Accordingly, Example 11 demonstrates that the shale inhibiting components comprising, a nanoparticle source used in the drilling fluids of the present invention are compatible with environmental regulations.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of drilling a well bore in a subterranean formation comprising shale comprising the steps of:
    providing a drilling fluid comprising an aqueous-based fluid, and a shale inhibiting component comprising a polyvinyl pyrrolidone nanoparticle source, wherein the polyvinyl pyrrolidone nanoparticle source comprises nanoparticles of polyvinyl pyrrolidone having an average particle size of less than about 1,000 nanometers;
    drilling the well bore in at least a portion of the subterranean formation that comprises shale using the drilling fluid; and
    allowing the drilling fluid to at least partially inhibit the degradation of the shale.

2. The method of claim 1 wherein the polyvinyl pyrrolidone nanoparticle source comprises crosslinked polyvinyl pyrrolidone.

3. The method of claim 1 wherein the drilling fluid further comprises a salt.

4. The method of claim 3 wherein the salt is present in the drilling fluid an amount in the range of from about 5 pounds per barrel to about the salt saturation limit of the drilling fluid.

5. The method of claim 3 wherein the salt comprises at least one salt selected from the group consisting of potassium chloride, calcium chloride, sodium chloride, potassium formate, calcium chloride, calcium bromide, potassium carbonate, and any mixture thereof.

6. The method of claim 1 wherein the drilling fluid further comprises at least one additive selected from the group consisting of an antifoam, a biocide, a bridging agent, a corrosion control agent, a dispersant, a flocculant, a fluid loss additive, a foamer, an $H_2S$ scavenger, a lubricant, an oxygen scavenger, a scale inhibitor, a viscosifier, and a weighting agent.

7. The method of claim 1 wherein the density of the drilling fluid is within the range of from about 7 pounds per gallon to about 22 pounds per gallon.

8. The method of claim 1 wherein the aqueous-based fluid is fresh water.

9. The method of claim 1 wherein the shale inhibiting component inhibits the degradation of shale by acting as a flocculant.

10. The method of claim 1 wherein the polyvinyl pyrrolidone nanoparticle source is present in the drilling fluid in an amount in the range of from about 0.0025% to about 5% by volume of the drilling fluid; and wherein the drilling fluid further comprises potassium chloride in an amount in the range of from about 5 pounds per barrel to about the salt saturation limit of the drilling fluid.

11. The method of claim 1 wherein the drilling fluid comprises rubber latex.

12. The method of claim 11 wherein the rubber latex comprises emulsion-polymerized copolymers of 1,3-butadiene and styrene.

13. The method of claim 1 wherein the drilling fluid comprises emulsion-polymerized copolymers of 1,3-butadiene and styrene, wherein the polyvinyl pyrrolidone nanoparticle source comprises crosslinked polyvinyl pyrrolidone.

14. The method of claim 1 wherein the polyvinyl pyrrolidone nanoparticle source is present in the drilling fluid in an amount in the range of from about 0.0025% by volume to about 5% by volume of the drilling fluid.

15. The method of claim 1 wherein the polyvinyl pyrrolidone nanoparticle source comprises nanoparticles having an average particle size of less than about 400 nanometers.

16. The method of claim 1 wherein the shale inhibiting component inhibits the degradation of shale by acting as a flocculant.

17. A method of enhancing the shale inhibition of an aqueous-based drilling fluid comprising:
adding to the drilling fluid a shale inhibiting component comprising a polyvinyl pyrrolidone nanoparticle source, wherein the polyvinyl pyrrolidone nanoparticle source comprises nanoparticles of polyvinyl pyrrolidone having an average particle size of less than about 1,000 nanometers and wherein the polyvinyl pyrrolidone nanoparticle source is present in the drilling fluid in an amount in the range of from about 0.0025% by volume to about 5% by volume of the drilling fluid;
placing the drilling fluid in a well bore penetrating at least a portion of a subterranean formation that comprises shale; and
allowing the drilling fluid to at least partially inhibit the degradation of the shale.

18. The method of claim 17 wherein the drilling fluid further comprises rubber latex.

19. The method of claim 18 wherein the rubber latex comprises emulsion-polymerized copolymers of 1,3-butadiene and styrene.

20. The method of claim 17 wherein the drilling fluid further comprises emulsion-polymerized copolymers of 1,3-butadiene and styrene, and wherein the polyvinyl pyrrolidone nanoparticle source comprises crosslinked polyvinyl pyrrolidone.

21. The method of claim 17 wherein the shale inhibiting component is added to the drilling fluid in an amount sufficient to inhibit the degradation of shale.

22. The method of claim 17 wherein the polyvinyl pyrrolidone nanoparticle source comprises nanoparticles having an average particle size of less than about 400 nanometers.

23. The method of claim 17 wherein the shale inhibiting component inhibits the degradation of shale by acting as a flocculant.

24. A method of drilling a well bore in a subterranean formation comprising:
providing a drilling fluid that comprises a polyvinyl pyrrolidone nanoparticle source wherein the polyvinyl pyrrolidone nanoparticle source comprises nanoparticles of polyvinyl pyrrolidone having an average particle size of less than about 1,000 nanometers;
drilling a well bore using the drilling fluid in at least a portion of the subterranean formation that comprises shale; and
allowing the drilling fluid to at least partially inhibit the degradation of the shale.

25. The method of claim 24 wherein the drilling fluid further comprises rubber latex.

26. A method of drilling in a subterranean formation that comprises shale, the method comprising:
providing a drilling fluid comprising
an aqueous-based fluid,
a shale inhibiting component comprising polyvinyl pyrrolidone nanoparticles having an average particle size of less than about 1,000 nanometers, wherein the polyvinyl pyrrolidone nanoparticles are present in an amount of from about 0.0025% to about 5% by volume of the drilling fluid,
at least one salt selected from the group consisting of potassium chloride, calcium chloride, sodium chloride, potassium formate, calcium chloride, calcium bromide, potassium carbonate, and any mixture thereof, wherein the salt is present in an amount of from about 5 pounds per barrel to about the salt saturation limit of the drilling fluid, and
at least one additive selected from the group consisting of: an antifoam, a biocide, a bridging agent, a corrosion control agent, a dispersant, a flocculant, a fluid loss additive, a foamer, an $H_2S$ scavenger, a lubricant, an oxygen scavenger, a scale inhibitor, a viscosifier, and a weighting agent,
wherein the density of the drilling fluid is from about 7 pounds per gallon to about 22 pounds per gallon;
drilling the well bore in at least a portion of the subterranean formation that comprises shale using the drilling fluid; and
allowing the drilling fluid to at least partially inhibit the degradation of the shale.

27. The method of claim 26 wherein the drilling fluid further comprises rubber latex nanoparticles.

28. The method of claim 27 wherein the rubber latex nanoparticles comprise emulsion-polymerized copolymers of 1,3-butadiene and styrene.

29. The method of claim 26 wherein the drilling fluid further comprises emulsion-polymerized copolymers of 1,3-butadiene and styrene, and wherein the polyvinyl pyrrolidone nanoparticles comprise crosslinked polyvinyl pyrrolidone.

30. The method of claim 26 wherein the polyvinyl pyrrolidone nanoparticles have an average particle size of less than about 400 nanometers.

31. The method of claim 26 wherein the polyvinyl pyrrolidone nanoparticles inhibit the degradation of shale by acting as a flocculant.

32. The method of claim 26 wherein the polyvinyl pyrrolidone nanoparticles comprise crosslinked polyvinyl pyrrolidone.

* * * * *